Figure 1:
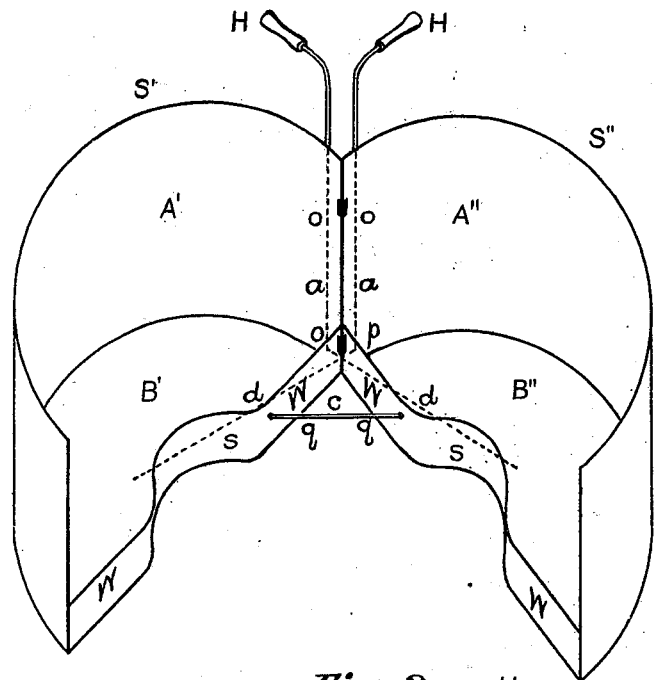

W. D. ENSIGN.
Potato Bug Catcher.

No. 201,916. Patented April 2, 1878.

Witnesses
Charles S. Brintnall
Giles Kelly

William D. Ensign
by W. E. Hagan
his attorney

Inventor

UNITED STATES PATENT OFFICE.

WILLIAM D. ENSIGN, OF MECHANICSVILLE, NEW YORK.

IMPROVEMENT IN POTATO-BUG CATCHERS.

Specification forming part of Letters Patent No. 201,916, dated April 2, 1878; application filed July 12, 1877.

*To all whom it may concern:*

Be it known that I, WILLIAM D. ENSIGN, of Mechanicsville, county of Saratoga, and State of New York, have invented a new and improved device for collecting and removing beetles and insects from potato-vines and growing plants, of which the following is a specification:

The nature of my invention consists in constructing a circular pan or oblong vessel, of tin or other suitable material, with flaring or straight sides, and in dividing the same diametrically in two parts, with the latter hinged to each other on their outer wall, so that they may open and close in the line of bisection.

Upon the dividing-line at the bottom of the vessel, at the center, or near the center, each half of the vessel is rounded out, so that when the hinged parts of the pan are closed against each other there will be formed in the bottom of the vessel or pan a circular or oval opening. Around this oval opening there is constructed an upwardly-projecting flange or wall, so as to inclose each section of the pan separately.

This arrangement and construction of a hinged and bisected vessel with the walled central opening constitutes a separate feature of my invention, considered by itself.

Another feature of my invention consists in arranging two actuating-handles, by means of which the hinged sections of the vessel may be made to open and close, and these are formed of strong wire or other suitable material, attached to each section separately at the bottom with a crossed shear-hinge and rivet, and extended upward and above the vessel, to which the hand-pieces, of wood, are secured.

The object to be accomplished by this device is that the vessel may be opened and placed around a hill of potato-vines, and then closed, so that the stalks at their base will be inclosed in the central opening of the vessel. When the device is thus applied and the vines shook or beaten with twig or stick, the adhering beetles and their larvæ will drop into the pan, and from which they cannot crawl, on account of the smooth surface of the side walls. After they have all been shook or beaten from the vine the pan may be opened by means of the handles, and the animals poured into a vessel of water or other receptacle and destroyed. It will be found to be a great improvement on the use of poison, and, with ordinary care in operation, all the beetles and embryo larvæ may be secured and destroyed that infest a locality.

I do not wish to be understood as limiting my invention to any particular form or shape of vessel, so long as it is made in two parts, hinged together, and having a central opening to inclose the stalks of the vines.

Where the inner walls of the sections come in contact with each other when they are closed, to prevent the stalks of the vines entering the space, a protecting-wire passes through each wall by means of a free opening, in which the wire is placed, so that the stalks will be confined to the central opening. This wire is looped at the ends to keep it from dropping out of place.

In the accompanying drawing there are two illustrations of my invention, both of which are shown in perspective, and the same letters are used to designate the same parts in both.

Figure 2:
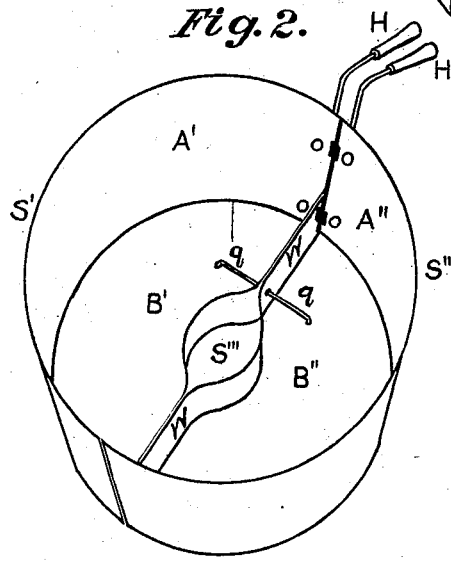

Figure 1 shows the vessel with its hinged parts opened, and Fig. 2 shows them closed.

The side walls of the vessel are designated at A' and A'', and the bisected parts at S' and S'', with the bottom of each part shown at B' and B'', and the inner wall of each at W W. The curve upon the line of division appears at $s\ s$, Fig. 1, forming, when the hinged parts are closed, the central walled opening S'''. (Shown in Fig. 2.)

The actuating-handles H H appear by letter-reference, and their continuation downward to join the bottom sections appears in the vertical dotted line $a\ a$, where they join the bottom. They are designated at $d\ d$ with their intersection and shear-hinge at $p$. The parts S' and S'' are shown as hinged to each other at O O. At $q\ q$ is shown a protecting-wire, passing through the inner walls.

Having thus described my invention, what I claim, and desire to secure by Letters Patent, is—

1. The bisected parts of the pan or vessel S' and S'', hinged to each other, so as to open and close, and, when closed, forming the central walled opening S''', arranged to operate as and for the purposes described.

2. The bisected parts of the pan or vessel S' and S'', hinged to each other, so as to open and close, and, when closed, forming the central walled opening S''', with the handles H H and protecting-wire $q\,q$, all arranged to operate as and for the purposes described.

Signed at Mechanicsville, New York, this 10th day of July, 1877.

WILLIAM D. ENSIGN.

Witnesses:
 JOHN C. GREENE,
 LEWIS W. ENSIGN.